(12) United States Patent
Schaar et al.

(10) Patent No.: US 10,541,505 B2
(45) Date of Patent: Jan. 21, 2020

(54) HIGH-POWER YTTERBIUM DOPED CALCIUM FLUORIDE MODE-LOCKED LASER AND METHODS OF USE

(71) Applicant: NEWPORT CORPORATION, Irvine, CA (US)

(72) Inventors: Joseph Schaar, Santa Clara, CA (US); Ching-Yuan Chien, Palo Alto, CA (US); Richard Boggy, Sunnyvale, CA (US); James D. Kafka, Palo Alto, CA (US); Adi Diner, Palo Alto, CA (US)

(73) Assignee: Newport corporation, Irvine, CA (US)

( * ) Notice: Subject to any disclaimer, the term of this patent is extended or adjusted under 35 U.S.C. 154(b) by 0 days.

(21) Appl. No.: 15/829,875

(22) Filed: Dec. 2, 2017

(65) Prior Publication Data
US 2018/0159292 A1    Jun. 7, 2018

Related U.S. Application Data

(60) Provisional application No. 62/429,830, filed on Dec. 4, 2016.

(51) Int. Cl.
| | |
|---|---|
| *H01S 3/06* | (2006.01) |
| *G02B 21/16* | (2006.01) |
| *G02F 1/39* | (2006.01) |
| *H01S 3/02* | (2006.01) |
| *H01S 3/042* | (2006.01) |
| *H01S 3/0941* | (2006.01) |

(Continued)

(52) U.S. Cl.
CPC ............ *H01S 3/0602* (2013.01); *G02B 21/16* (2013.01); *G02F 1/39* (2013.01); *H01S 3/025* (2013.01); *H01S 3/042* (2013.01); *H01S 3/09415* (2013.01); *H01S 3/1106* (2013.01); *H01S 3/165* (2013.01); *H01S 3/1618* (2013.01); *G02B 2207/114* (2013.01); *H01S 3/0404* (2013.01); *H01S 3/094042* (2013.01)

(58) Field of Classification Search
CPC .. H01S 3/0092; H01S 3/09415; H01S 3/1618; H01S 3/165; G02F 1/3551; G02F 1/37; G02F 1/39
See application file for complete search history.

(56) References Cited

U.S. PATENT DOCUMENTS

| | | |
|---|---|---|
| 5,047,668 A | 9/1991 | Bosenberg |
| 5,296,960 A | 3/1994 | Ellingson |
| | (Continued) | |

OTHER PUBLICATIONS

A. Pugžlys, et al., "Multi-mJ, 200-fs, cw-pumped, cryogenically cooled, Yb,Na:CaF2 amplifier," Opt. Lett. 34, pp. 2075-2077 (2009).*
S. Ricaud, et al., "Highly efficient, high-power, broadly tunable, cryogenically cooled and diode-pumped Yb:CaF2," Opt. Lett. 35, pp. 3757-3759 (2010).*
F. Friebel, et al., "Diode-pumped 99 fs Yb:CaF2 oscillator," Opt. Lett. 34, pp. 1474-1476 (2009).*

(Continued)

*Primary Examiner* — Daniel Petkovsek
(74) *Attorney, Agent, or Firm* — Brian F. Swienton (57) ABSTRACT

A high-power ytterbium-doped calcium fluoride laser system is disclosed herein which includes at least one pump source, at least one laser cavity formed by at least one high reflector and at least one output coupler, and at least one ytterbium-doped calcium fluoride optical crystal positioned within the laser cavity in communication with the pump source, the ytterbium-doped calcium fluoride optical crystal configured to output at least one output signal of at least 20 W, having a pulse width of 200 fs or less, and a repetition rate of at least 40 MHz.

22 Claims, 5 Drawing Sheets

(51) Int. Cl.
*H01S 3/11* (2006.01)
*H01S 3/16* (2006.01)
*H01S 3/04* (2006.01)
*H01S 3/094* (2006.01)

(56) References Cited

U.S. PATENT DOCUMENTS

| | | | |
|---|---|---|---|
| 5,371,752 A | 12/1994 | Powers | |
| 5,457,707 A | 10/1995 | Sobey | |
| 5,606,453 A | 2/1997 | Walling | |
| 5,742,626 A | 4/1998 | Mead | |
| 6,236,779 B1 | 5/2001 | Kafka | |
| 6,363,090 B1* | 3/2002 | Wintner | H01S 3/0604 372/18 |
| 6,373,869 B1 | 4/2002 | Jacob | |
| 7,620,077 B2 | 11/2009 | Henderson | |
| 7,898,731 B2* | 3/2011 | Sharping | G02F 1/395 359/330 |
| 8,310,749 B2* | 11/2012 | Mottay | H01S 3/0057 359/337.1 |
| 8,902,939 B2 | 12/2014 | Kafka | |
| 9,188,833 B2* | 11/2015 | Hodgson | H01S 3/0057 |
| 9,397,467 B2* | 7/2016 | Cormier | H01S 3/094042 |
| 9,419,559 B2 | 8/2016 | Morgner | |
| 9,470,954 B2 | 10/2016 | Mason | |
| 9,658,513 B2* | 5/2017 | Mildren | H01S 3/30 |
| 2002/0185478 A1 | 12/2002 | Kafka | |
| 2003/0008448 A1 | 1/2003 | Kafka | |
| 2003/0137719 A1 | 7/2003 | Van Der Veer | |
| 2005/0243876 A1 | 11/2005 | Kung | |
| 2016/0211642 A1 | 7/2016 | Kafka | |
| 2017/0063018 A1* | 3/2017 | Starodoumov | H01S 3/06716 |
| 2019/0235346 A1* | 8/2019 | Royon | G02F 1/225 |

OTHER PUBLICATIONS

Chu, et al., "Intracavity KTP-based OPO pumped by a dual-loss modulated, simultaneously Q-switched and mode-locked Nd:GGG laser," Optics Express (Optical Society of America), vol. 22, No. 22, Nov. 2014.

Kaucikas, et al., "Beam patterns in an optical parametric oscillator set-up employing walk-off compensating beta barium borate crystals," Laser Physics 23 (2013) 025401.

Akbari, et al., "Optical, spectral and phase-matching properties of BIBO, BBO and LBO crystals for optical parametric oscillation in the visible and near-infrared wavelength ranges," Laser Physics 23 (2013) 035401.

Stankevičiūtė, et al., "Optical parametric oscillators synchronously pumped by fundamental and second harmonic radiation of femtosecond Yb:KGW laser," Proceedings, SPIE 8845 Ultrafast Imaging and Spectroscopy, 884519 (Sep. 28, 2013).

Ebrahim-Zadeh, et al., "Yb-Fiber-Laser-Pumped Continuous-Wave Frequency Conversion Sources from the Mid-Infrared to the Ultraviolet," IEEE Journal of Selected Topics in Quantum Electronics, vol. 20, No. 5, Sep./Oct. 2014.

Ramaiah-Badarla, et al., "Two-crystal, synchronously pumped, femtosecond optical parametric oscillator," Optics Letters, vol. 40, No. 3, Feb. 1, 2015.

Phillips, et al., "Parametric processes in quasi-phasematching gratings with random duty cycle errors," Journal of the Optical Society of America, vol. 30, No. 4, Apr. 2013.

Schmidt, et al., "Noncollinear parametric amplification in the near-infrared based on type-II phase matching," Journal of Optics; 17 (2015), 9.-094003.

Jeong, et al., "Visible-pulse generation in gain crystal of near-infrared femtosecond optical parametric oscillator," Optics Express (Optical Society of America), vol. 23, No. 20, Oct. 5, 2015.

* cited by examiner

| Yb Material | $P_{ave}$ (W) | Rep rate (MHz) | E (µJ) | $\tau_p$ (fs) | $P_{peak}$ (0.88, MW) | Geometry |
|---|---|---|---|---|---|---|
| YAG | 275 | 16.3 | 16.87 | 583 | 25.5 | Disk |
| YAG | 145 | 3.5 | 41.43 | 1100 | 33.1 | Disk |
| YAG | 242 | 3 | 80.67 | 1000 | 66.0 | Disk |
| YAG | 44 | 4 | 11.00 | 791 | 12.2 | Disk |
| YAG | 270 | 19 | 14.21 | 330 | 37.9 | Disk |
| YAG | 155 | 15.6 | 9.94 | 140 | 62 | Disk |
| KYW | 22 | 25 | 0.88 | 240 | 3.2 | Disk |
| CALGO | 28 | 21 | 1.33 | 300 | 3.9 | Disk |
| CALGO | 20 | 21 | 0.95 | 197 | 4.3 | Disk |
| CALGO | 12.5 | 80 | 0.16 | 94 | 1.5 | Bulk |
| CALGO | 0.015 | 200 | 0.0001 | 40 | 0.0017 | Bulk |
| LuO | 141 | 60 | 2.35 | 738 | 2.8 | Disk |
| YCOB | 2 | 20 | 0.10 | 270 | 0.3 | Disk |
| LuScO | 23 | 70 | 0.33 | 235 | 1.2 | Disk |
| CaF2 | 6.6 | 35 | 0.19 | 445 | 0.4 | Disk |
| CaF2 | 17.8 | 10 | 1.78 | 285 | 5.5 | Disk |
| CaF2 | 2.3 | 73 | 0.03 | 68 | 0.4 | Bulk |
| CaF2 | 0.38 | 113 | 0.0034 | 99 | 0.030 | Bulk |
| CaF2 | 1.74 | 85 | 0.02 | 230 | 0.08 | Bulk |
| CaF2 | 0.56 | 82 | 0.01 | 117 | 0.05 | Bulk |
| CaF2 | 2.7 | 73 | 0.04 | 48 | 0.7 | Bulk |
| CaF2 | 30 | 80 | 0.38 | 150 | 2.2 | Bulk | ized
HIGH-POWER YTTERBIUM DOPED CALCIUM FLUORIDE MODE-LOCKED LASER AND METHODS OF USE

CROSS-REFERENCE TO RELATED APPLICATION

The present application claims priority to U.S. Provisional Patent Appl. Ser. No. 62/429,830, filed on Dec. 4, 2016, entitled "High-Power Ytterbium Doped Calcium Fluoride Mode-Locked Laser and Methods of Use," the entire contents of which are incorporated by reference herein.

BACKGROUND

High-power mode-locked laser systems are presently used in a variety of applications, such as multi-photon microscopy and device manufacturing. Presently, three types of high power, mode-locked laser systems are commonly available for these applications: thin disk laser systems, chirped pulse fiber amplifier systems and bulk laser systems. Thin disk laser systems are a diode pumped solid state laser system which includes a thin layer of active gain material positioned on a heat sink. A pump signal from a diode pump source is incident multiple times on the active gain material, which produces an output signal in response thereto. Historically, disk laser systems have been capable of producing high average powers. However, disk laser systems have been largely incapable of reliably producing output signals having pulse widths of less than about 500 femtoseconds (hereinafter "fs") and at high average power and high repetition rates. Further, disk laser systems require a complex and expensive optical pumping configuration and thermal management system. Due to peak power limitations, fiber based high power, mode-locked lasers require an oscillator and a chirped pulse amplifier which includes stretching the pulse prior to amplification and then subsequent compression after amplification, thus adding cost and complexity to the system.

Figure 1:
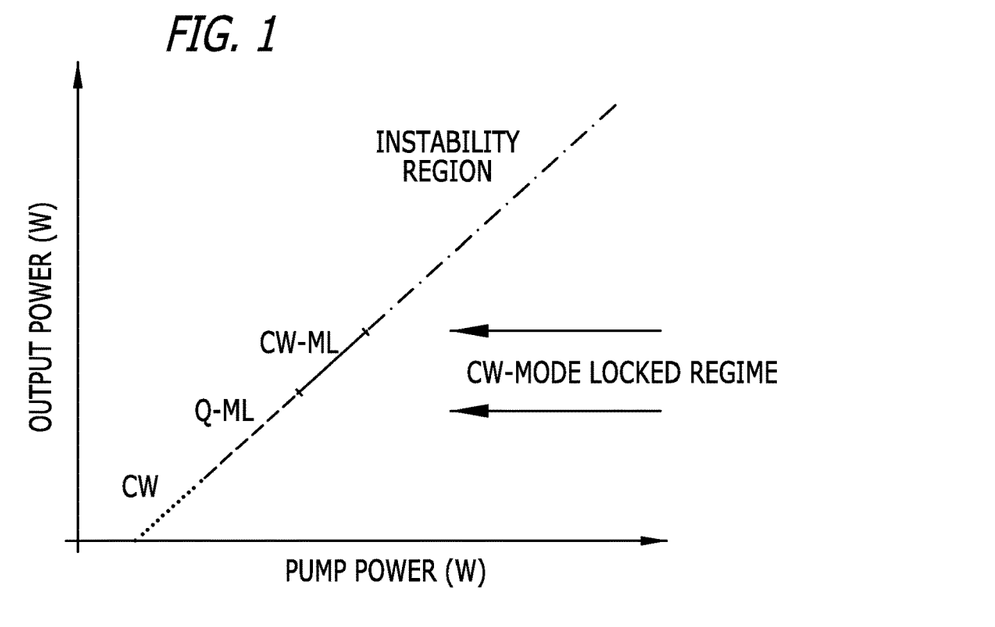
FIG. 1 shows graphically the mode-locking regime of a prior art high-power laser system.

In contrast, bulk high power, mode-locked laser systems use optical crystals, such as Yb:YAG, Yb:CALGO, Yb:KYW or Yb:KGW, as the gain material. While prior art bulk high power mode-locked laser systems have proven useful in the past, a number of shortcomings have been identified. Often, the high power optical pumping of the optical crystal results in one or more undesirable thermal effects within the optical crystal. For example, one or more thermal lenses may be created within the optical crystal, thereby reducing the output power of the laser system. Typically, the average output power of these prior art bulk laser systems is less than about 15 W. FIG. 1 shows graphically the range wherein a continuous wave mode-locked (CW-ML) signal is outputted from the laser within prior art laser cavities as a function of average output power versus average pump power from the pump source. As shown, the narrow CW-ML regime is terminated by the undesirable instability regime. As such, operations or systems that require a CW-ML signal are restricted to relatively low optical average power applications. In addition, presently available bulk high-power mode-locked laser systems tend to be complex systems requiring multiple pump sources, complex thermal management systems, and the like.

Thus in light of the foregoing, there is an ongoing need for a simple, low cost high-power mode-locked laser system capable of producing short pulses at high average powers. There is a further need for a simple, low cost high-power mode-locked laser system capable of producing sub 200 fs pulse durations with average powers of more than 20 W. Further, there is an ongoing need for a simple, low cost high-power mode-locked laser system capable of producing these short pulse durations and high average powers at sufficient repetition rates for applications. Further, there is a need for a simple, low cost high-power mode-locked laser system with an extended CW-ML range for ease of manufacturing and robustness.

SUMMARY

The present application discloses various embodiments of a high-power mode-locked laser system and methods of use. In one embodiment, the present application discloses a high-power ytterbium-doped calcium fluoride laser system. The high-power ytterbium-doped calcium fluoride laser system may include at least one pump source configured to provide at least one pump signal. The pump signal may be directed into at least one laser cavity formed by at least one high reflector and at least one output coupler. Further, at least one ytterbium-doped calcium fluoride optical crystal may be positioned within the at least one laser cavity. The ytterbium-doped calcium fluoride laser system in communication with and pumped by the pump signal from the pump source and may be configured to output at least one output at least one output signal having a output power of 20 W or more and pulse width of about 200 fs of less.

In another embodiment, the present application is directed to a high-power bulk laser system. Like the previous embodiment, the high-power bulk laser includes at least one pump source. At least one laser cavity formed from at least one high reflector and at least one output coupler may be configured to receive the pump signal from the pump source. At least one bulk optical crystal may be positioned within the laser cavity and is in communication with pump source. The bulk optical crystal may be configured to output at least one output signal 20 W and 200 fs which may be outputted from the output coupler.

In yet another embodiment, the present application discloses a high-power laser. The high-power laser includes at least one pump source. At least one laser cavity formed by at least one high reflector at least one output coupler may be configured to receive the pump signal. At least one gain media may be positioned within the laser cavity and may be in communication with the pump source. The gain media may be configured to output at least one output signal of at least 20 W, having a pulse width of 200 fs or less, and a repetition rate of at least 40 MHz from the at least one output coupler.

Other features and advantages of the high-power mode locked laser system and method of use as described herein will become more apparent from a consideration of the following detailed description.

BRIEF DESCRIPTION OF THE DRAWINGS

The novel aspects of the high-power mode locked laser system and method of use as disclosed herein will be more apparent by review of the following figures, wherein.

DETAILED DESCRIPTION

Figure 2:
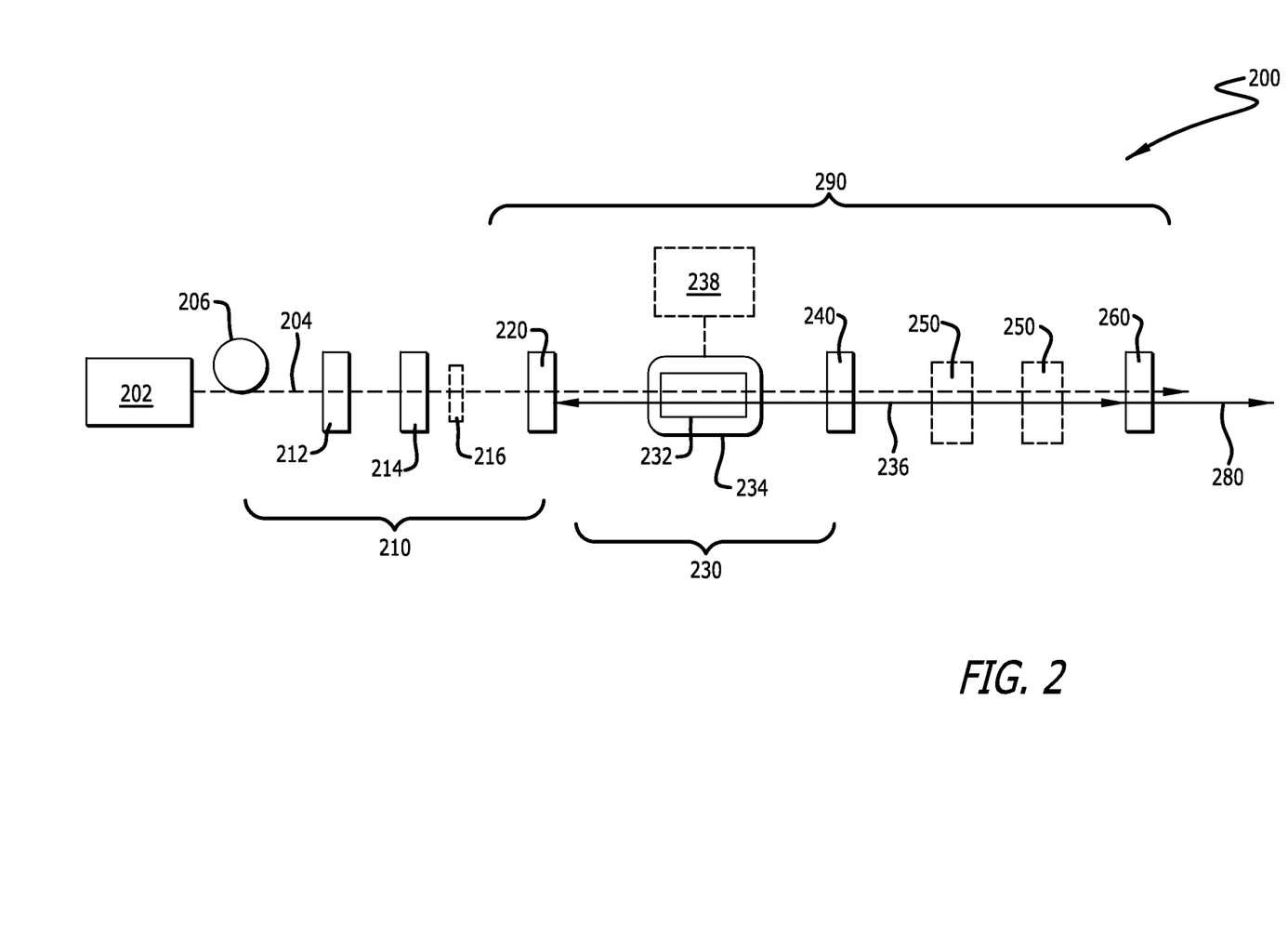
FIG. 2 shows a schematic of an embodiment of a high-power mode-locked laser system having a single diode pump source delivering a pump signal to the laser cavity via a fiber optic device.

The present application is directed to various embodiments of a high-power ytterbium-doped calcium fluoride (hereinafter "Yb:CaF$_2$") mode-locked laser system for use with various optical systems. The various embodiments of the high-power Yb:CaF$_2$ mode-locked laser system include a novel cavity design configured to take advantage of the unique photothermal properties of Yb-doped optical crystals such as Yb:CaF$_2$ to provide output signals having a continuous mode-locking range spanning approximately fifty percent (50%) of the upper region of the dynamic range of the output power of the laser system while reducing or eliminating spectral instabilities at the upper regions of the mode-locking window while having the lowest or nearly lowest order transverse spatial Gaussian beam (TEM$_{00}$) being resonant. In one embodiment, the high-power Yb:CaF$_2$ mode-locked laser system described herein may be configured to deliver nearly transform-limited, sub-300 fs pulses with average output powers exceeding about 20 W, at repetition rates greater than about 50 MHz. For example, in one embodiment, the bulk Yb:CaF$_2$ laser systems described herein may be configured to deliver nearly transform-limited, sub-200 fs pulses with average output powers exceeding about 25 W, at repetition rates greater than about 70 MHz. In another embodiment, the bulk Yb:CaF$_2$ laser systems described in herein may be configured to deliver nearly transform-limited, sub-150 fs pulses with average output powers exceeding about 30 W or more, at repetition rates greater than about 80 MHz. The high-power Yb:CaF$_2$ mode-locked laser systems disclosed herein may be used in conjunction with harmonic crystals, optical parametric oscillators, and similar devices for various multi-photon microscopy applications. Optionally, the high power Yb:CaF$_2$ mode-locked laser systems disclosed herein may be configured for use in laser-based spectroscopy applications, including, for example, dual-comb spectroscopy applications. In another embodiment, the high-power Yb:CaF$_2$ mode-locked laser systems disclosed herein may include at least one amplifier module positioned therein or coupled thereto, thereby providing a high-power mode-locked laser system. Optionally, the high-power Yb:CaF$_2$ mode-locked laser systems may be used as a pump source for pumping near-infrared optical parametric oscillators (hereinafter "OPOs") and/or mid-infrared OPOs, and/or far-infrared OPOs, and/or optical parametric generators. In another application, the high-power Yb:CaF$_2$ mode-locked laser system described herein may be used for manufacturing a variety of devices, such as writing waveguides and the like. In yet another application, the high-power Yb:CaF$_2$ mode-locked laser system described herein may be used in conjunction with non-linear optical materials, including fiber-based non-linear optical devices and/or bulk nonlinear devices such as sapphire, YAG or diamond to produce supercontinuum generation systems and devices. In yet another application, the high-power Yb:CaF$_2$ mode-locked laser system described herein may be used for producing a dual comb source for spectroscopy applications. FIG. 2 shows a schematic diagram of an embodiment of a high-power Yb:CaF$_2$ mode-locked laser system (hereinafter "laser system"). As shown, the laser system 200 includes at least one pump source 202 configured to output at least one pump signal 204. In one embodiment, the pump signal 204 has a wavelength of about 850 nm to about 995 nm. For example, in one embodiment, the pump signal 204 has a wavelength of about 979 nm. In another embodiment, the pump signal 204 has a wavelength of about 940 nm. Optionally, the pump signal 204 may have a wavelength of about 976 nm. In yet another embodiment, the pump signal 204 has a wavelength of about 917 nm. In another embodiment, the pump signal 204 may include multiple wavelengths therein. Further, the pump source 202 may be configured to output a continuous wave pump signal 204. In another embodiment, the pump source 202 may be configured to output at least one pulsed pump signal 204.

In the illustrated embodiment, the pump source 202 comprises a single diode-based pump source having multiple emitters therein, the emitters each configured to output an optical signal. For example, in one embodiment, single-diode pump source comprises multiple laser diode emitters located within a single diode package or device, wherein each emitter is configured to output an optical signal into a single fiber optic device. As such, the single fiber optic device may be configured to receive the optical signals from the multiple laser diode emitters and output a single pump signal. Optionally, multiple diode-based pump sources may be used in the present system. Further, any variety of alternate pump sources may be used with the laser system 200. For example, fiber lasers may be used as the pump source 202. As shown, at least one fiber optic device 206 may be coupled to or otherwise in optical communication with the single diode-based pump source 202 and configured to receive the multiple optical signals from the multiple emitters within the pump source 202 and output a single pump signal 204 therefrom. In one embodiment, the fiber optic device 206 is configured to output a single mode-mixed pump signal 204. Optionally, the fiber optic device 206 may be configured to output a non-mode-mixed pump signal 204. Further, the fiber optic device 206 may be configured to alter the polarization of at least one pump signal from at least one of the emitters within the pump source 202. For example, the fiber optic device 206 may be configured to output a pump signal 204 having a single linear polarization. In the alternative, the fiber optic device 206 may be configured to output a pump signal 204 having elliptical polarization. In another alternative, the fiber optic device 206 may be configured to output a depolarized pump signal 204. Optionally, the fiber optic device 206 may be configured to mix the modes, polarization, intensity, and the like of at least two optical signals received from at least two emitters positioned within the pump source 202. Those skilled in the art will appreciate that the fiber optic device 206 may be manufactured in any variety of lengths, transverse dimensions, and the like. Further, in one embodiment, the fiber optic device 206 may comprise multimode fiber with a core size of 100 microns, 200 microns or the like, single-mode fiber, graded-index fiber, holey fiber, photonic crystal fiber, and the like.

Referring again to FIG. 2, the pump signal 204 may be directed into at least one optical system 210. In the illustrated embodiment, the optical system 210 includes a first lens 212 and an optional second lens 214. As such, FIG. 2 shows a laser system 200 having a telescope of lens devuce or system configured to focus the telescope pump signal 204 into the laser. Those skilled in the art will appreciate that any number or type of optical components or device may be used in the optical system 210. For example, as shown in FIG. 2, at least one optional optical component 216 may be positioned within or proximate to the optical system 210. Exemplary optional optical elements 216 include, without limitations, lenses, gratings, spectral filters, beam splitters, sensors, spatial apertures, shutters, modulators, attenuators, homogenizers, polarizers, and the like.

As shown in FIG. 2, the pump signal 204 may traverse through at least one of the high reflector 220 and/or output coupler 260 and may be incident on at least one optical crystal system 230 positioned within the laser cavity 290. In the illustrated embodiment, the high reflector 220 includes at least one optical coating configured to reflect substantially all (i.e., greater than about 99.9%) intra-cavity signal 236 (i.e., light having a wavelength of about 1000 nm to about 1700 nm) while transmitting substantially all the pump signal 204 (i.e., light having a wavelength of about 850 nm to about 995 nm) there through. In the illustrated embodiment, the high reflector 220 comprises at least one planar body. In another embodiment, the high reflector 220 comprises a curved or arcuate body. Further, the high reflector 220 may be coupled to at least one optical stage or mount. Optionally, the optical stage supporting the high reflector 220 may comprise an adjustable mirror mount. In the alternative, the optical stage supporting the high reflector 220 may comprise a non-adjustable mirror mount.

Referring again to FIG. 2, at least one optical crystal system 230 may be positioned within the laser cavity 290 and be configured to receive at least a portion of the pump signal 204 therein. In one embodiment, the optical crystal system 230 comprises at least one optical crystal 232 positioned on at least one crystal mount 234. In one embodiment, the optical crystal 232 comprises at least one bulk, optical material. Exemplary bulk, optical materials include, without limitations, ytterbium doped calcium fluoride (hereinafter "Yb:$CaF_2$") single crystal materials, Yb:$CaF_2$ ceramic materials, Yb:CALGO, other ytterbium doped gain media and the like. Optionally, the Yb:$CaF_2$ material described herein may include one or more additional dopants known in the art. For example, in one embodiment, the Yb:$CaF_2$ materials described herein may have an absorption spectrum which extends from about 880 nm to about 1100 nm. Further, the Yb:$CaF_2$ materials may be configured to generate at least one intra-cavity signal 236 having a wavelength from about 1000 nm to about 1700 nm or more in response to being pumped by the pump signal 204. Optionally, multiple optical crystals 232 may be positioned within laser cavity 290. The optical crystal 232 may include at least one facet orthogonal to the incident pump signal 204 or at least one facet which is angled relative to the incident pump signal 204. Further, the pump signal 204 may propagate along any direction of the optical crystal 232. As such, the optical crystal 232 may comprise a <100>-cut crystal. In another embodiment, the optical crystal 232 may comprise a <110>-cut crystal. Optionally, the optical crystal 232 may comprise a <111>-cut crystal. Optionally the crystal may be cut in any other propagation direction.

As shown in FIG. 2, the optical crystal 232 may be positioned on at least one crystal mount 234 configured to securely and precisely position the optical crystal 232 within the laser cavity 290. In the illustrative embodiment, the laser cavity 290 comprises a linear cavity. Optionally, the laser cavity 290 may comprise a folded cavity, a Z-cavity, a ring cavity, and the like. As such, the laser system 200 may include one or more additional fixed and/or adjustable fold mirrors, planar mirrors, curved mirrors, dichroic mirrors, dispersion-management mirrors, and the like configured to permit the user to configure that cavity architecture as desired. In the illustrate embodiment, the crystal mount 234 may be in communication with at least one thermal control system 238. For example, if present, the thermal control system 238 may include one or more thermoelectric chillers, fluid sources, heaters, thermocouples, sensors, and the like. During use, the thermal control system 238 may be configured to monitor and control the temperature of the crystal mount 234 and optical crystal 232 positioned on the crystal mount 234. As such, crystal mount 234 may be manufactured from any variety of materials, including material having a high coefficient of thermal conductivity. Optionally, thermal control system 238 may comprise one or more fans or similar devices configured to cool the optical crystal 232 positioned on the crystal mount 234 through convection, thereby eliminating the need for the complex water-based conductive thermal control systems used in many lasers presently. As such, the crystal mount 234 may include one or more features or elements, such as fins, heat sinks, and the like configured to aid the convection cooling of the optical crystal 232. Further, the thermal control system 238 may be in communication with at least one internal or external processor configured to monitor and maintain the optical crystal 232 at a desired temperature. Optionally, the laser system 200 may be operated without a thermal control system 238.

Referring again to FIG. 2, the optical crystal 232 is configured to generate at least one intra-cavity signal 236 in response to being pumped by the pump signal 204. The intra-cavity signal 236 may be directed into at least one mode-locking system 240 positioned within or proximate to the laser cavity 290. In one embodiment, the mode-locking system 240 comprises at least one Kerr lens mode-locking system (hereinafter "KLM system"). In another embodiment, the mode-locking system 240 comprises at least one saturable absorber, semiconductor saturable absorber mirror (hereinafter "SESAM"), and/or hybrid KLM/SESAM system configured to permit self-starting mode-locking. In another embodiment, the mode-locking system 240 comprises a non-linear-optical crystal in which intentionally phase mismatched harmonic generation provides the self-starting mode-locking. Those skilled in the art will appreciate that any variety of alternate mode-locking system and devices may be used with the laser system 200.

As shown in FIG. 2, at least one intra-cavity optical component 250 may be positioned within the laser cavity 290. In the illustrated embodiment, two intra-cavity optical components 250 are positioned within the laser cavity 290, although those skilled in the art will appreciate that any number of devices may be used in various locations within the laser cavity 290. In one embodiment, the intra-cavity optical component 250 comprises a spatial filter. In another embodiment, the intra-cavity optical component 250 comprises a polarizer. For example, the laser system 200 may be operated in a linear polarization state, wherein the intra-cavity optical component 250 comprises an intra-cavity polarization selection element. As such, the laser system 200 may simultaneously operate in two orthogonal linearly polarized states in a collinear configuration. Additionally, the two polarization states may operate at slightly different repetition rates while occupying the same cavity volume reducing common-mode noise levels on the output signal 280.

Optionally, any variety of optical components may be used as the intra-cavity optical component 250, including, without limitations, lenses, beam splitters, mirrors, optical filters, apertures, stops, irises, sensors, prisms, dispersion compensation devices or systems, group delay dispersion devices and systems, Gires-Tournois interferometer mirrors, modulators, optical flats, Brewster windows, and the like. In another embodiment, the intra-cavity optical component 250 comprises at least one harmonic generation device or crystal. For example, the intra-cavity optical component 250 may comprise at least one harmonic generation device configured to produce at least one second harmonic signal, third harmonic signal, fourth harmonic signal, and or the like when pumped with at least one of the pump signal 204 and/or intra-cavity signal 236.

Referring again to FIG. 2, the laser system 200 includes at least one output coupler 260, which, in combination with the high reflector 220, defines the laser cavity 290. In one embodiment, the output coupler 260 is configured to transmit between about five percent (5%) to about fifty percent (50%) of the intra-cavity signal 236, thereby permitting at least a portion of the intra-cavity signal 236 to exit the laser cavity 290, thereby producing an output signal 280 having a wavelength of about 1000 nm to about 1700 nm. For example, in one embodiment, the output signal 280 has a wavelength between about 1000 nm and 1100 nm. In another embodiment the output coupler 260 is configured to transmit more the about five percent (5%) and less than about fifty percent (50%) of the intra-cavity signal 236. Further, the unique bulk Yb:CaF$_2$ laser system 200 described herein (as well as the laser systems described below and shown in FIGS. 3 and 4) may be configured to deliver nearly transform-limited, sub-300 fs pulses with average output powers exceeding about 20 W, at repetition rates greater than about 50 MHz. For example, in one embodiment, the bulk Yb:CaF$_2$ laser systems described in herein may be configured to deliver nearly transform-limited, sub-200 fs pulses with average output powers exceeding about 25 W, at repetition rates greater than about 70 MHz. Optionally, there are applications where the input peak power of the output signal 280 is limited, for example, continuum generation in fibers, where self-focusing leads to damage of the fiber at less than 1 MW peak power and higher. For such applications the average power of the laser system 200 may be increased by increasing the repetition rate of the laser system 200 while keeping both the pulse energy and the pulse duration (and thus the peak power) fixed. Thus for a 100 nJ pulse with 100 fs duration, a repetition rate of 100 MHz would lead to a 10 W average power laser while a repetition rate of 200 MHz would produce 20 W of average power, both with 1 MW of peak power. Such a higher repetition rate laser would produce a higher average power continuum source and be physically shorter and thus more compact.

In another embodiment, the bulk Yb:CaF$_2$ laser systems described in herein may be configured to deliver nearly transform-limited, sub-150 fs pulses with average output powers exceeding about 30 W or more, at repetition rates greater than about 80 MHz. In another embodiment, the various laser systems disclosed herein may be configured to output at least one output signal of at least 20 W, having a pulse width of 200 fs or less, and a repetition rate of at least 300 MHz. Optionally, the various laser systems disclosed herein may be configured to output at least one output signal of at least 20 W, having a pulse width of 200 fs or less, and a repetition rate of at least 400 MHz. Further, as shown in FIG. 2, an intra-cavity optical component 250 may be a mirror configured to reflect at least a portion of the pump signal 204 back into the optical crystal 232. Optionally, the output coupler 260 may include any additional or alternate optical coatings applied thereto. Exemplary additional coatings may include, without limitations, polarizing coatings, bandpass filter coatings, notch filter coatings, wavelength selective coatings, and the like.

Figure 3:
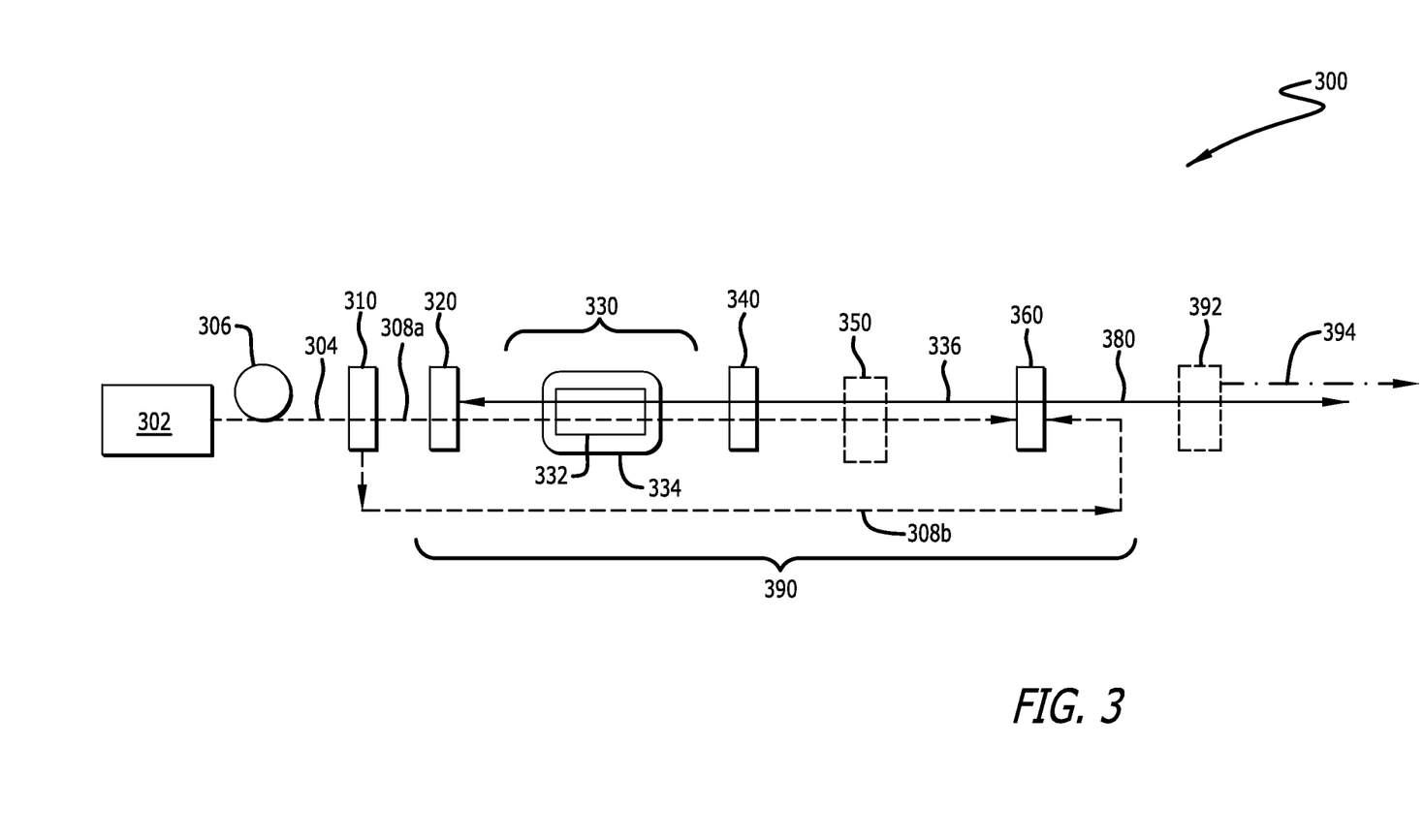
FIG. 3 shows a schematic of another embodiment of a high-power mode-locked laser system having a single diode pump source delivering multiple pump signals to the laser cavity.

FIG. 3 shows a schematic of another embodiment of a high-power ytterbium doped calcium fluoride mode-locked laser system (hereinafter "laser system"). Like the previous embodiment, the laser system 300 includes a single diode-based pump source 302 configured to output at least one pump signal 304. Like the previous embodiment, the laser system includes at least one fiber optic device 306 coupled to or otherwise in communication with the single diode-based pump source 302. The pump signal 304 may have a wavelength of about 850 nm to about 995 nm. For example, in one embodiment, the pump signal 304 has a wavelength of about 979 nm. In another embodiment, the pump signal 304 has a wavelength of about 940 nm. In another embodiment, the pump signal 304 has a wavelength of about 976 nm. In yet another embodiment, the pump signal 304 has a wavelength of about 917 nm. In another embodiment, the pump signal 304 may include multiple wavelengths therein. Further, the single diode-based pump source 302 may be configured to output a continuous wave pump signal 304. In another embodiment, the single diode-based pump source 302 may be configured to output at least one pulsed pump signal 304.

Referring again to FIG. 3, the pump signal 304 outputted by the fiber optic device 306 coupled to the single diode-based pump source 302 may be directed into at least one optical system 310 as described above. For example, the optical system 310 may comprise at least one telescope, collimator, and the like. In the illustrated embodiment, the optical system 310 includes a beam splitter configured to receive the pump signal 304 and form a first pump beam 308a and at least a second pump beam 308b. Optionally, the optical system 310 may include various fiber optics devices, waveguides, lenses, mirrors, and the like permitting at least one of the first and second pump beams 308a, 308b to be inserted into the laser cavity 390 at any desired location.

As shown in FIG. 3, the laser cavity 390 may be defined by a high reflector 320 and an output coupler 360. Those skilled in the art will appreciate the laser cavity 390 maybe formed in any variety of configurations, including, without limitations, linear configurations, folded cavities, Z cavities, ring cavities, and the like. As such, any number of planar or curved fold mirrors, reflectors, optical mounts, and the like may be used to form any desired cavity architecture. As shown, the high reflector 320 is configured to permit at least a portion of the first pump beam 308a to traverse there through. As such, like the previous embodiment, the high reflector 320 may include one or more optical coatings applied thereto. The first pump beam 308a may traverse through the high reflector 320 and may be incident on at least one optical crystal 330 and/or optical crystal 332 positioned within the laser cavity 390. In the illustrated embodiment, the high reflector 320 includes at least one optical coating configured to reflect substantially all (i.e., greater than about 99.9%) of the intra-cavity signal 336 (i.e., light having a wavelength of about 1000 nm to about 1700 nm) while transmitting substantially all the first pump beam 308a (i.e., light having a wavelength of about 850 nm to about 995 nm) there through. In the illustrated embodiment, the high reflector 320 comprises at least one planar body. In another embodiment, the high reflector 320 comprises a curved or arcuate body. Further, the high reflector 320 may be coupled to at least one optical stage or mount. Optionally, the optical stage supporting the high reflector 320 may comprise an adjustable mirror mount. In the alternative, optical stage supporting the high reflector 320 may comprise a non-adjustable mirror mount.

Like the first pump beam 308a, the second pump beam 308b may be directed into the laser cavity 390 and made to be incident upon the optical crystal system 330 positioned within the laser cavity 390. In the illustrated embodiment, the second pump beam 308b is directed through the output coupler 360. Optionally, the second pump beam 308b may be directed through to the output coupler 360 using one or more optical fibers, waveguides, mirrors, free space propagation systems, and the like. For example, one or more fiber optic conduits may be configured to receive the second pump beam 308b from the optical system 310 and direct the second pump beam 308b into the laser cavity 390 via the output coupler 360. In another embodiment, one or more mirrors may be configured to receive the second pump beam 308b from the optical system 310 and direct at least a portion of the second pump beam 308b into the laser cavity 390.

Referring again to FIG. 3, at least one optical crystal system 330 may be positioned within the laser cavity 390 and be configured to receive at least a portion of the first pump beam 308a and/or second pump beam 308b therein. Like the previous embodiment, the optical crystal system 330 may comprise at least one optical crystal 332 positioned on at least one crystal mount 334. Optionally, the optical crystal may comprise at least one bulk, optical material. Exemplary bulk, optical materials include, without limitations, ytterbium doped calcium fluoride "Yb:$CaF_2$," single crystal materials, Yb:$CaF_2$ ceramic materials, Yb:CALGO, Yb:KGW, Yb:KYW, Yb:glass, Yb:LuO, Yb:YCOB, Yb:LuScO, other Yb doped gain media and the like. Optionally, the Yb:$CaF_2$ material described herein may include one or more additional dopants known in the art. For example, in one embodiment, the Yb:$CaF_2$ materials described herein may have an absorption spectrum which extends from about 880 nm to about 1100 nm. Further, the Yb:$CaF_2$ materials may be configured to generate at least one intra-cavity signal 336 having a wavelength from about 1000 nm to about 1700 nm or more in response to being pumped by at least one of the first and second pump beams 308a, 308b. Optionally, multiple optical crystals 332 may be positioned within laser cavity 390.

As shown in FIG. 3, the optical crystal 332 may be positioned on at least one crystal mount 334 configured to securely and precisely position the optical crystal 332 within the laser cavity 390. In one embodiment, the optical crystal system 330 may be in communication with one or more thermal control systems (not shown) similar to the thermal control systems described above (See Paragraph [0008], FIG. 2). For example, if present, the thermal control system may include one or more thermoelectric coolers, chillers, fluid sources, heaters, thermocouples, sensors, and the like. For cost and simplicity, often it is desirable to eliminate water cooling of the optical crystal 332 and thus eliminate the components used in such a thermal control system, such as the chiller. In the illustrated embodiment, the optical crystal system 330 comprises an air-cooled crystal mount system 334. Those skilled in the art will appreciate that the various laser systems described in the present application may operate well above known damage thresholds without substantial degradation of average power, even at elevated temperatures. Further, the cavity mode (the laser mode of the intra-cavity signal 336) is relatively insensitive to temperature due to the weak thermal lens generated in the Yb:$CaF_2$ optical crystal during use as compared to the strong thermal lens created in other active optical materials. Thus, the laser systems disclosed in the present application may be operated at temperatures of 30° C. or higher without a substantial decrease in performance. As such, the crystal mount 334 may include one or more features, fins, elements, and the like configured to enhance convection cooling of the crystal mount 334, and by extension, cooling of the optical crystal 332.

Referring again to FIG. 3, the optical crystal 332 is configured to generate at least one intra-cavity signal 336 in response to being pumped by the first and second pump beams 308a, 308b. The intra-cavity signal 336 may be directed into at least one mode-locking system 340 positioned within or proximate to the laser cavity 390. The intra-cavity optical component 350 may comprise a spatial filter. In another embodiment, the intra-cavity optical component 350 comprises a polarizer. Optionally, any variety of optical components may be used as the intra-cavity optical component 350, including, without limitations, lenses, beam splitters, mirrors, optical filters, aperture, stops, irises, sensors, prisms, dispersion compensation devices or systems, group delay dispersion devices and systems, Gires-Tournois interferometer mirrors, modulators, optical flats, Brewster windows, and the like. In another embodiment, the intra-cavity optical component 350 comprises at least one harmonic generation device or crystal. For example, the intra-cavity optical component 350 may comprise at least one harmonic generation device configured to produce at least one second harmonic signal, third harmonic signal, fourth harmonic signal, and the like when pumped with at least one of the first pump beam 308a, second pump beam 308b, and/or intra-cavity signal 336. Optionally, the laser system may be cavity dumped to increase the pulse energy.

Referring again to FIG. 3, the laser system 300 includes at least one output coupler 360, which, as stated above, in combination with the high reflector 320, defines the laser cavity 390. In one embodiment, the output coupler 360 is configured to reflect about five percent (5%) to about fifty percent (50%) of the intra-cavity signal 336, thereby permitting at least a portion of the intra-cavity signal 336 to exit the laser cavity 390, thereby producing an output signal 380 having a wavelength of about 1000 nm to about 1700 nm. For example, in one embodiment, the output signal 380 has a wavelength between about 1000 nm and 1100 nm. Optionally, the output coupler 360 may include any additional or alternate optical coatings applied thereto. Exemplary additional coatings may include, without limitations, polarizing coatings, bandpass filter coatings, notch filter coatings, wavelength-selective coatings, and the like.

As shown in FIG. 3, at least one optical system or device 392 may be coupled to or positioned in optical communication with the laser cavity 390 and configured to receive the output signal 380 and direct, modify, measure, or otherwise condition the output signal 380 prior to use. For example, in one embodiment, the external optical system 392 is configured to output at least one modified output signal 394. Optionally, the external optical system 392 comprises at least one harmonic generation system configured to output one or more harmonic optical signals in response to being irradiated by the output signal 380. For example, the external optical system 392 may include at least one second harmonic generation device therein. In another embodiment, the external optical system 392 may include at least one third harmonic generation device therein. In another embodiment, the external optical system 392 comprises at least one frequency doubling device and at least one optical parametric oscillator therein. Further, the external optical system 392 may comprise one or more amplifiers. In another embodiment, the external optical system 392 comprises an infrared optical parametric oscillator which may be configured to be directly pumped by the output signal 380. As such, the external optical parametric oscillator 392 may include one or more non-linear materials such as PPLN, PPLT, PPKTP, KTP, BBO, LBO, and the like. Optionally, the infrared optical parametric oscillator may be cavity dumped to increase the pulse energy and/or intra-cavity frequency doubled to extend the tuning range. The tuning range of the infrared optical parametric oscillator may be further extended to the mid-infrared by difference frequency mixing using the signal and idler from the OPO, or to the visible by sum frequency mixing using the signal and pump or idler and pump. Those skilled in the art will appreciate that any of the laser systems described herein may include one or more external optical systems discussed above.

Figure 4:
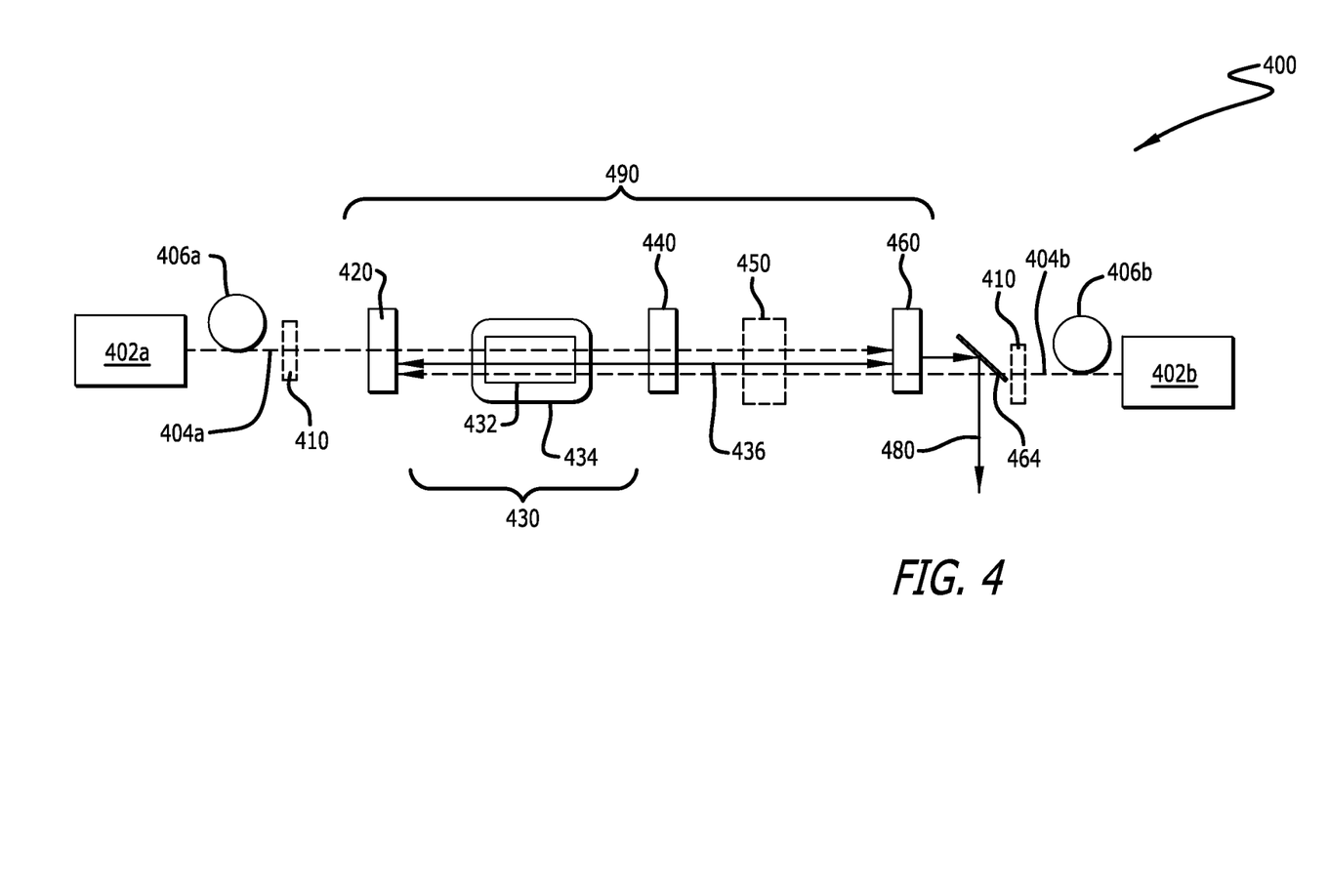
FIG. 4 shows a schematic of an embodiment of a high-power mode-locked laser system having a multiple diode pump sources delivering multiple pump signals to the laser cavity.

FIG. 4 shows a schematic of another embodiment of a high-Yb:$CaF_2$ mode-locked laser system. As shown, the laser system 400 includes a first pump source 402a and at least a second pump source 402b. Like the previous embodiments, the first pump source 402a and the second pump source 402b may comprise a diode-based pump device, although those skilled in the art will appreciate that any variety of pump sources may be used with the laser systems described in the present applications. Further, the first pump source 402a may be coupled to a first fiber optic device 406a. Similarly, the second pump source 402b may be coupled to a second fiber optic device 406b. The first pump source 402a is configured to generate at least one pump signal 404a, while the second pump source 402b is configured to generate at least a second pump signal 404b. In one embodiment, at least one of the first and second pump signals 404a, 404b has a wavelength of about 850 nm to about 995 nm. For example, in one embodiment, at least one of the first and second pump signals 404a, 404b has a wavelength of about 979 nm. In another embodiment, at least one of the first and second pump signals 404a, 404b has a wavelength of about 976 nm. In another embodiment, at least one of the first and second pump signals 404a, 404b has a wavelength of about 940 nm. In yet another embodiment, at least one of the first and second pump signals 404a, 404b has a wavelength of about 917 nm. Optionally, the first and second pump signals 404a, 404b may have the same or different wavelengths, polarizations, repetition rates, powers, and the like. Further, at least one of the first and second pump sources 402a, 402b may be configured to output a continuous wave pump signal. In another embodiment, at least one of the first and second pump sources 402a, 402b may be configured to output at least one pulsed pump signal.

Referring again to FIG. 4, the first and second pump signals 404a, 404b may be directed into at least one optical system 410. Those skilled in the art will appreciate that any number or type of optical components or device may be used in the optical system 410. For example, as shown in FIG. 4, at least one of the optical systems 420 comprises beam director configured to transmit substantially all of the second pump signal 404b there through while reflecting substantially all of the output signal 480. Exemplary other optional optical elements for use in the optical system 410 include, without limitations, lenses, gratings, filters, beam splitters, sensors, apertures, shutters, modulators, attenuators, homogenizers, polarizers, and the like.

As shown in FIG. 4, the first pump signal 404a may traverse through at least one high reflector 420 and may be incident on at least one optical crystal system 430 positioned within the laser cavity 490. Similarly, the second pump signal 404b may traverse through at least one output coupler 460 and may be incident on the optical crystal system 430 positioned within the laser cavity 490. Like the previous embodiments, the high reflector 420 and output coupler 460 may include one or more coatings described above applied thereto. Further, the high reflector 420 and/or output coupler 460 may comprise planar bodies or curved bodies.

Referring again to FIG. 4, at least one optical crystal system 430 may be positioned within the laser cavity 490 and be configured to receive at least a portion of the first and second pump signals 404a, 404b therein. In one embodiment, the optical crystal system 430 comprises at least one optical crystal 432 positioned on at least one crystal mount 434. In one embodiment, the optical crystal 432 comprises at least one bulk, optical material. Exemplary bulk, optical materials include, without limitations, Yb:$CaF_2$ single crystal materials, Yb:$CaF_2$ ceramic materials, Yb:CALGO, other Yb doped gain media, and the like. Optionally, the Yb:$CaF_2$ material described herein may include one or more additional dopants known in the art. For example, in one embodiment, the Yb:$CaF_2$ materials described herein may have an absorption spectrum which extends from about 880 nm to about 1100 nm. Further, the Yb:$CaF_2$ materials may be configured to generate at least one intra-cavity signal 436 having a wavelength from about 1000 nm to about 1700 nm or more in response to being pumped by the first and second pump signals 404a, 404b. Optionally, multiple optical crystals 432 may be positioned within laser cavity 490. Optionally, the crystal mount 434 supporting the optical crystal 432 may be configured to be air cooled, fluid cooled, and the like. As such, the crystal mount 434 may be in communication with at least one fan, chiller, thermoelectric cooler, sensor, and the like.

Referring again to FIG. 4, the optical crystal 432 is configured to generate at least one intra-cavity signal 436 in response to being pumped by at least one of the first and second pump signals 404a, 404b. The intra-cavity signal 436 may be directed into at least one mode-locking system 440 positioned within or proximate to the laser cavity 490. In one embodiment, the mode-locking system 440 comprises at least one Kerr lens mode-locking system (hereinafter "KLM system"). In another embodiment, the mode-locking system 440 comprises at least one saturable absorber, semiconductor saturable absorber mirror (hereinafter "SESAM"), and/or hybrid KLM/SESAM system configured to permit self-starting mode-locking. In another embodiment, the mode-locking system 240 comprises a non-linear-optical crystal in which intentionally phase mis-matched harmonic generation (e.g. second harmonic generation, third harmonic generations, etc.) and provides the self-starting mode-locking. Those skilled in the art will appreciate that any variety of alternative mode-locking system and devices may be used with the laser system 400.

As shown in FIG. 4, at least one intra-cavity optical component 450 may be positioned within the laser cavity 490. In one embodiment, the intra-cavity optical component 450 comprises a spatial filter. In another embodiment, the intra-cavity optical component 450 comprises a polarizer. Optionally, any variety of optical components may be used as the intra-cavity optical component 450, including, without limitations, lenses, beam splitters, mirrors, optical filters, apertures, stops, irises, sensors, prisms, dispersion compensation devices or systems, group delay dispersion devices and systems, Gires-Tournois interferometer mirrors, modulators, optical flats, Brewster windows, and the like. In another embodiment, the intra-cavity optical component 450 comprises at least one harmonic generation device or crystal.

Referring again to FIG. 4, the laser system 400 includes at least one output coupler 460, which, in combination with the high reflector 420, defines the laser cavity 490. In one embodiment, the output coupler 460 is configured to output an output signal 480 having a wavelength of about 1000 nm to about 1700 nm. For example, in one embodiment, the output signal 480 has a wavelength between about 1000 nm and 1100 nm. Optionally, the output coupler 460 may include any additional or alternate optical coatings applied thereto. Exemplary additional coatings may include, without limitations, polarizing coatings, bandpass filter coatings, notch filter coatings, wavelength selective coatings, and the like.

Figure 5:
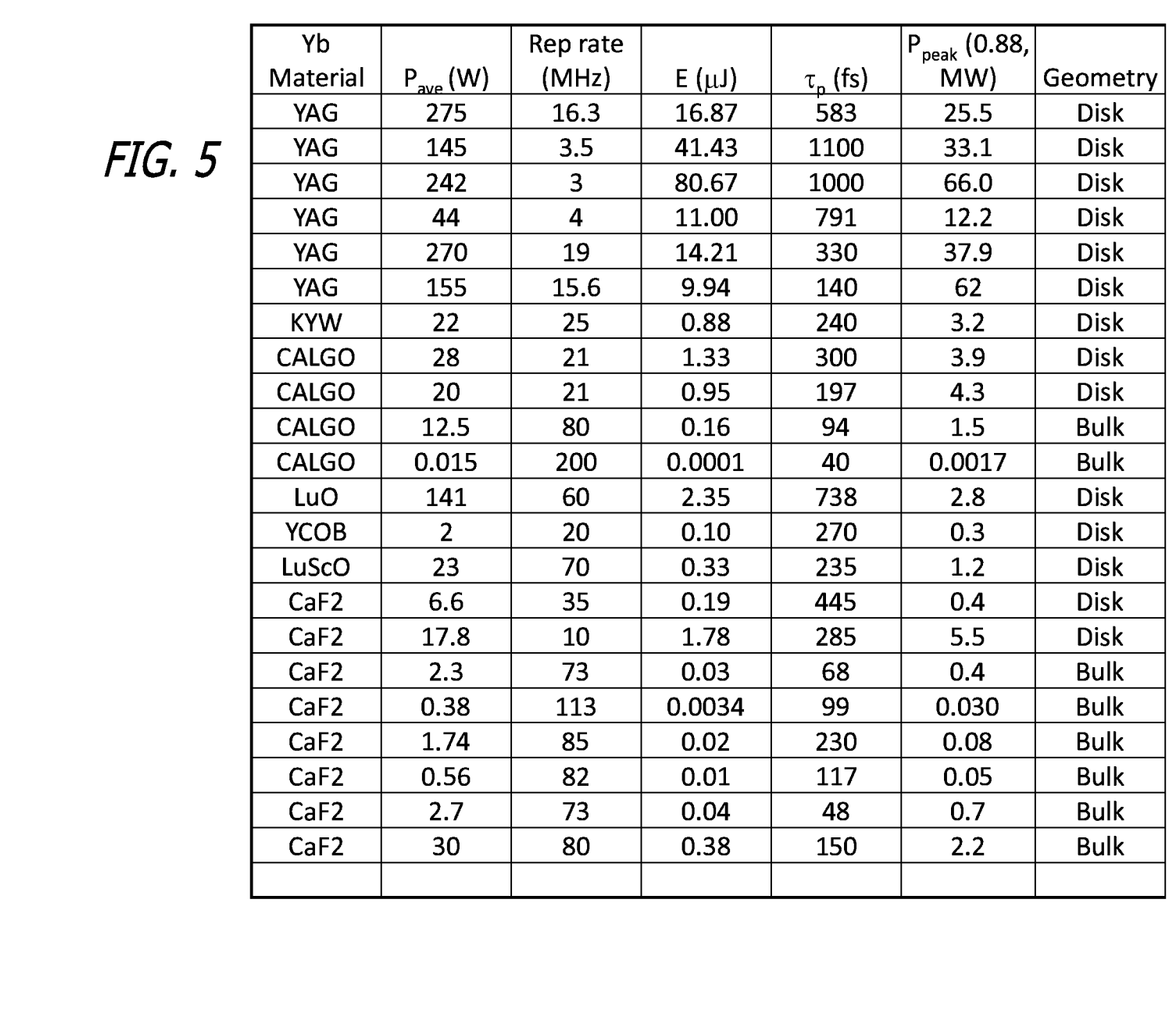
FIG. 5 shows a table comparing the performance of the novel bulk Yb:CaF$_2$ laser systems described herein relative to the performance of prior art laser.

FIG. 5 shows a table comparing the performance of the novel bulk Yb:CaF$_2$ laser systems described herein relative to the performance of prior art laser systems commonly used in multi-photon microscopy applications, optogenetics, micromachining and similar applications. As shown, the novel bulk Yb:CaF$_2$ laser systems described herein are capable of providing an output signal 280 having an average power in excess of about 20 W, with a repetition rate in excess of about 60 MHz, and a sub-200 fs pulse width. Optionally, the novel bulk Yb:CaF$_2$ laser systems described herein are capable of providing an output signal having an average power in excess of about 25 W, with a repetition rate in excess of about 60 MHz, and a sub-200 fs pulse width. In another embodiment, the novel bulk Yb:CaF$_2$ laser systems described herein are capable of providing an output signal 280 having an average power in excess of about 30 W or more, with a repetition rate in excess of about 60 MHz, and a sub-200 fs pulse width. Rather, the majority of competing prior art laser system comprise complex thin disk laser systems, which are, by definition, not bulk laser systems. Moreover, these disk laser systems are incapable of providing high power output signals at repetition rates of greater than about 50 MHz, and sub-200 fs pulse widths. In contrast, as shown in FIG. 5, prior art bulk laser systems are capable of providing comparable repetition rates and pulse widths relative to the novel bulk Yb:CaF$_2$ laser systems described herein. Unfortunately, however, the prior art bulk laser systems are incapable of provide output powers of 20 W or more.

Figure 6:
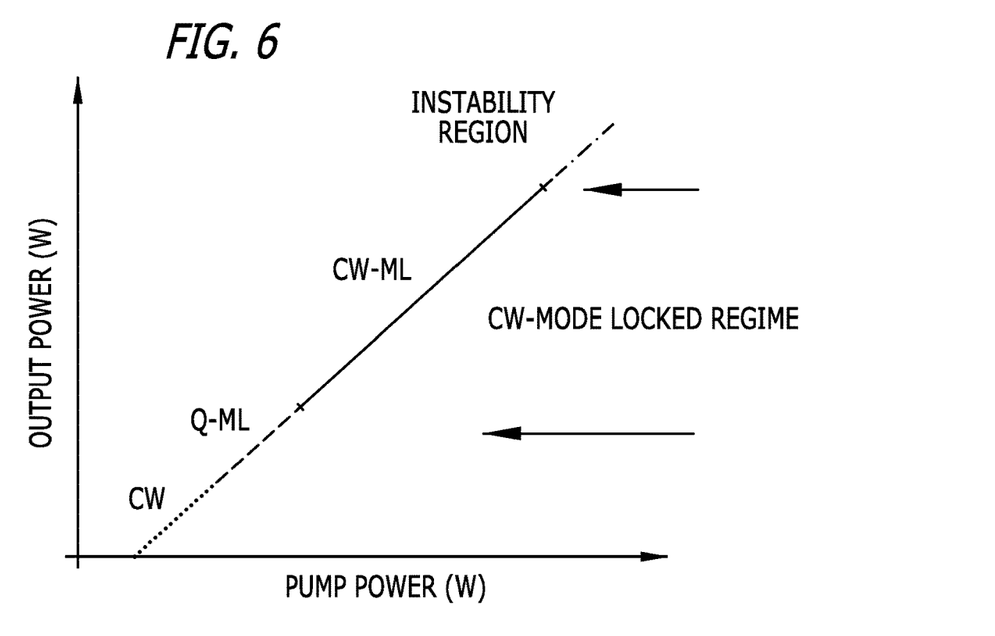
FIG. 6 shows graphically the improved performance and increased mode-locking regime achieved by the embodiments of the Yb:CaF$_2$ mode-locked laser system disclosed herein.

FIG. 6 shows graphically the improved performance achieved by the embodiments of the Yb:CaF$_2$ mode-locked laser system disclosed herein. More specifically, FIG. 6 shows graphically the range wherein a continuous wave mode-locked signal is outputted from the output coupler of the laser cavities described herein as a function of output power versus pump power from the pump source. As discussed above, the cavity of the laser systems described herein may be used with any variety of optical crystals, however, these cavities are particularly well suited for the inclusion of ytterbium doped optical crystals therein. All mode-locked oscillators have a limited operating range over which they produce a stable train of single ultrafast pulses. The behavior shown in FIG. 1 is representative of oscillators that are mode-locked using semiconductor saturable absorber mirrors but other mode-locking techniques produce similar results. At low pump power, the oscillator first reaches threshold and then produces cw output with no pulses at all. At higher pump power, a region of q-switched mode-locked (Q-ML) operation is observed until at a yet higher pump power the desired cw mode-locked (CW-ML) performance is achieved. This region of cw mode-locked operation is limited and an instability regime will always occur at higher pump powers. These instabilities may include, multiple pulsing, spectral instabilities, spatial instabilities and/or temporal instabilities. As shown in FIG. 6, the CW-ML operational regime of the Yb:CaF$_2$ crystal positioned within the present laser cavities is considerably larger than the CW-ML operational regime of prior art laser systems as shown in FIG. 1. As a result, a higher power, stable intra-cavity signal 236 (See FIG. 2) may be output by the Yb:CaF$_2$ laser than prior art systems, thus yielding a higher output signal 280. This large cw mode-locked range is a result of weak thermal lensing, optimum cavity design and optimum saturable absorber design and leads to increased robustness and manufacturability of the laser system. The laser can also be operated with a light loop that modifies the pump power in order to keep the output power constant without the risk of operating in the instability regime.

The embodiments disclosed herein are illustrative of the principles of the invention. Other modifications may be employed which are within the scope of the invention. Accordingly, the devices disclosed in the present application are not limited to that precisely as shown and described herein.

What is claimed is:

1. A high-power ytterbium-doped calcium fluoride laser system, comprising:
   at least one pump source;
   at least one laser cavity formed by at least one reflector and at least one output coupler;
   at least one ytterbium-doped calcium fluoride optical crystal positioned within the at least one laser cavity, the at least one ytterbium-doped calcium fluoride optical crystal in communication with and pumped by the at least one pump source and configured to output at least one output signal having an output power of 20W or more and a pulse width of 200 fs or less.

2. The high-power ytterbium-doped calcium fluoride laser system of claim 1 wherein the at least one pump source is configured to output at least one pump signal, comprising a continuous wave pump signal.

3. The high-power ytterbium-doped calcium fluoride laser system of claim 1 wherein the at least one output signal comprises a continuous wave mode-locked signal.

4. The high-power ytterbium-doped calcium fluoride laser system of claim 1 wherein the at least one pump source comprises multiple laser diode emitters located within a single diode package coupled to a single fiber optic device, each emitter configured to output an optical signal into the single fiber optic device, the single fiber optic device configured to receive the optical signals from the multiple laser diode emitters and output a single pump signal.

5. The high-power ytterbium-doped calcium fluoride laser system of claim 1 further comprising at least one at least one crystal mount positioned within the at least one laser cavity, the at least one crystal mount configured to support and position the at least one ytterbium-doped calcium fluoride optical crystal at a desired position within the at least one laser cavity.

6. The high-power ytterbium-doped calcium fluoride laser system of claim 5 wherein the at least one crystal mount includes at least one thermal control feature configured to enhance convection cooling of the at least one ytterbium-doped calcium fluoride optical crystal positioned on the at least one crystal mount.

7. The high-power ytterbium-doped calcium fluoride laser system of claim 6 further comprising at least one thermal control system configured to aid in cooling the at least one ytterbium-doped calcium fluoride optical crystal.

8. The high-power ytterbium-doped calcium fluoride laser system of claim 7 wherein the at least one thermal control system comprises an air-cooling system.

9. The high-power ytterbium-doped calcium fluoride laser system of claim 1 wherein the at least one ytterbium-doped calcium fluoride optical crystal comprises a <111>cut crystal.

10. The high-power ytterbium-doped calcium fluoride laser system of claim 1 wherein the at least one output signal has a continuous mode-locking range spanning at least fifty percent (50%) of an upper region of a dynamic range of the output power.

11. A high-power bulk laser system, comprising:
at least one pump source;
at least one laser cavity formed from at least one reflector and at least one output coupler;
at least one bulk optical crystal positioned within the at least one laser cavity and in communication with the at least one pump source, the at least one bulk optical crystal configured to output at least one output signal of 20 W or more and 200 fs or less, the at least one output signal configured to be outputted from the at least one output coupler.

12. The high-power bulk laser system of claim 11 wherein the at least one pump source is configured to output at least one pump signal, comprising a continuous wave pump signal.

13. The high-power bulk laser system of claim 11 wherein the at least one output signal comprises a continuous wave mode-locked signal.

14. The high-power bulk laser system of the claim 11 wherein the at least one pump source comprises at least one fiber optic device coupled in optical communication with a single diode-based pump source.

15. The high-power bulk laser system of claim 11 wherein the at least one high-power bulk laser system comprises an air-cooled laser system.

16. The high-power bulk laser system of claim 11 wherein the at least one pump source comprises multiple laser diode emitters located within a single diode package coupled to a single fiber optic device, each emitter configured to output at least one optical signal into the single fiber optic device, the single fiber optic device configured to receive the at least one optical signal from the multiple laser diode emitters and output a single pump signal.

17. The high-power bulk laser system of claim 11 further comprising at least one thermal control system configured to aid in cooling the at least one bulk optical crystal.

18. The high-power bulk laser system of claim 11 wherein the at least one output signal has a continuous mode-locking range spanning at least fifty percent (50%) of an upper region of a dynamic range of the output power.

19. A high-power ytterbium-doped calcium fluoride laser system for use in multi-photon microscopy systems, comprising:
at least one pump source configured to output at least one pump signal;
at least one laser cavity formed by at least one reflector and at least one output coupler;
at least one ytterbium-doped calcium fluoride optical crystal positioned within the at least one optical parametric oscillator, the at least one ytterbium-doped calcium fluoride optical crystal in communication with and pumped by the at least one pump signal and configured to output at least one output signal having a output power of 20W or more and pulse width of 200 fs of less;
at least one harmonic generation system in optical communication with the at least one ytterbium-doped calcium fluoride laser, the at least one harmonic generation system configured to receive the optical parametric oscillator output signal and output at least one harmonic output signal;
at least one optical parametric oscillator formed by at least one high reflector and at least one output coupler and in optical communication with the at least one ytterbium-doped calcium fluoride laser; and
at least one multi-photon microscopy system in optical communication with at least one of the optical parametric oscillator.

20. The high-power laser system of claim 19 wherein the at least one pump source comprises multiple laser diode emitters located within a single diode package coupled to a single fiber optic device, each emitter configured to output at least one optical signal into the single fiber optic device, the single fiber optic device configured to receive the at least one optical signal from the multiple laser diode emitters and output a single pump signal.

21. The high-power laser system of claim 19 wherein the at least one harmonic output signal comprises a second harmonic of the at least one ytterbium doped calcium fluoride laser system output signal.

22. The high-power ytterbium-doped calcium fluoride laser system of claim 19 wherein the at least one harmonic output signal comprises a third harmonic of the at least one ytterbium doped calcium fluoride laser system output signal.

* * * * *